United States Patent [19]

Smith

[11] Patent Number: 4,498,525

[45] Date of Patent: Feb. 12, 1985

[54] FUEL/OIL HEAT EXCHANGE SYSTEM FOR AN ENGINE

[75] Inventor: Stanley Smith, Gloucestershire, England

[73] Assignee: Rolls-Royce Limited, London, England

[21] Appl. No.: 445,567

[22] Filed: Nov. 30, 1982

[30] Foreign Application Priority Data

Dec. 10, 1981 [GB] United Kingdom ............... 8137324

[51] Int. Cl.$^3$ ............................................ F02M 31/00
[52] U.S. Cl. ........................................ 165/39; 165/51; 123/552; 123/557; 184/6.4; 184/6.22; 60/39.093
[58] Field of Search ............... 123/557, 552, 41.33; 184/6.11, 6.22, 6.4; 60/39.093; 165/39, 51

[56] References Cited

U.S. PATENT DOCUMENTS

| | | | |
|---|---|---|---|
| 2,464,047 | 3/1949 | Larkin | 60/39.093 X |
| 3,080,716 | 3/1963 | Cummings et al. | 184/6.22 X |
| 3,722,212 | 3/1973 | Stein | 184/6.11 X |
| 4,020,632 | 5/1977 | Coffinberry et al. | 60/39.093 X |
| 4,041,697 | 8/1977 | Coffinberry et al. | 123/557 X |
| 4,072,138 | 2/1978 | Hawkins et al. | 123/557 X |
| 4,151,710 | 5/1979 | Griffin et al. | 184/6.11 X |
| 4,169,442 | 10/1979 | Fossum | 123/557 X |

FOREIGN PATENT DOCUMENTS

| | | | |
|---|---|---|---|
| 742270 | 12/1955 | United Kingdom | 60/39.093 |
| 912762 | 12/1962 | United Kingdom | 165/51 |

*Primary Examiner*—William R. Cline
*Assistant Examiner*—Edward P. Walker
*Attorney, Agent, or Firm*—Parkhurst & Oliff

[57] ABSTRACT

A fuel/oil heat exchange system is proposed for an aircraft gas turbine engine for heating fuel leaving the aircraft fuel tanks before it enters the engine fuel system. The proposed system eliminates the separate fuel heater. The oil system is designed so that the fuel is not overheated at the hottest engine conditions, and the fuel/oil heat exchange system is made to increase the temperature of the oil if the fuel temperature drops below a pre-determined limit.

Referring to FIG. 2 of the drawings, oil from the engine gearbox 16 is passed by scavenge pump 20 to a fuel heating coil 14 in the heat exchanger 12. Fuel from the aircraft passes through the heat exchanger prior to entering the fuel system 7 through fuel filter 6. A temperature sensing device 26 signals a reduction in fuel temperature below a desired level and closes a valve 24 preventing oil passing beneath baffle 25 to the scavenge pump. This causes the oil level to rise until oil spills over the baffle 25, at which level the gears 23 dip into the oil and churn it causing its temperature to increase.

4 Claims, 2 Drawing Figures

U.S. Patent  Feb. 12, 1985  4,498,525
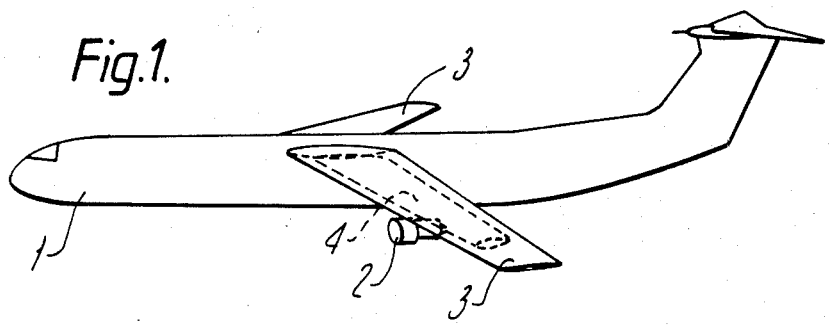
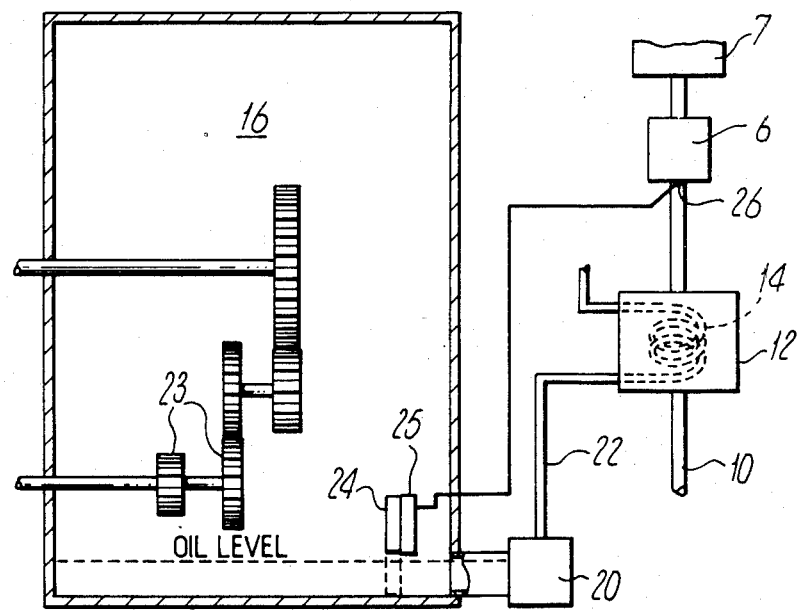

FUEL/OIL HEAT EXCHANGE SYSTEM FOR AN ENGINE

The present invention relates to a fuel/oil exchange system for an engine and relates in particular to such a system for an aircraft gas turbine engine.

During aircraft operation, fuel is withdrawn from fuel tanks on the aircraft and is passed to a filter at the inlet to the engine fuel system. To prevent blocking of the fuel filter due to the formation of wax or ice in the fuel when the fuel is very cold, a heat exchanger is provided on the engine or the aircraft, in the fuel line upstream of the filter to warm up the fuel before it enters the fuel filter. Conventional heat exchangers use hot air bled from the engine compressor which produce an adverse effect on the engine efficiency when they are operating.

It is known, however, in an engine fuel system, to use cold fuel as a cooling medium for the engine oil, which has the beneficial effect that heat picked up by the oil in operation of the engine is not wasted but is added to the fuel prior to combustion thereof.

It is an object of the present invention to provide a fuel/oil heat exchange system on the engine which is capable of pre-heating the fuel from the aircraft as it enters the engine fuel system so that the additional heater exchanger normally provided on the aircraft can be dispensed with.

However, there are problems associated with a simple substitution of the conventional heat exchanger by the oil cooler.

For example, the requirement to cool the oil is a continuous requirement, whereas the requirement to heat the fuel at this particular location in the fuel system is intermittent. Since the fuel filter is at the inlet to the engine fuel system continuous operation of the oil cooler, if the oil is very hot, could result in heat input to the fuel at this location which would be excessive, and would cause problems with the operation of the fuel system.

On the other hand, attention is currently being focussed on minimising the reduction in engine efficiency caused by excessive heating of the oil in operation of the engine. Measures being taken to reduce heat input to the oil may thus reduce the capacity of the fuel cooled oil cooler to satisfactorily carry out the function of heating large quantities of very cold fuel from the aircraft. This is because the times when the greatest heating is required, i.e. when icing of the fuel filter is most likely, are often those times when the engine is not operating at maximum power, for example, during descent from high altitude, or at idling in cold climates.

It is a further object of the present invention, therefore, to provide a fuel/oil heat exchange system for an engine in which the heat input from the oil to the fuel is variable.

According to the present invention, in an engine having a fuel system, an oil system and a gearbox, there is provided a fuel/oil heat exchange system comprising, a heat exchanger located to receive fuel flowing through the engine fuel system, a scavenge system for removing oil from the gearbox and passing it through the heat exchanger in heat exchange relationship with the fuel therein, a temperature sensitive device for sensing the temperature of the fuel at a location downstream of the heat exchanger, and, means controlled by the temperature sensitive device for varying the level of the oil in the gearbox in order to vary the heat input to the oil due to churning of the oil by the gears thereby controlling the temperature of the fuel at the location of the temperature sensing device.

In one embodiment of the invention the temperature sensitive device is located on the fuel filter through which the cold fuel from the aircraft fuel tanks passes, and the heat exchanger is arranged to be close to the fuel filter. The arrangement is such that if the temperature of the fuel entering the fuel filter falls to a level at which waxing and ice formation in the fuel is to be expected, the temperature sensitive device operates the valve in the gearbox to put more heat into the fuel and keep it above the waxing temperature.

An example of the invention will now be more particularly described with reference to the accompanying drawings in which:

FIG. 1 is a diagrammatic view of a gas turbine engine in an aircraft and including a fuel/oil heat exchange system according to the present invention.

FIG. 2 is a diagrammatic layout of the fuel/oil heat exchange system of FIG. 1.

Referring now to FIG. 1 of the drawings, there is shown an aircraft 1 having two gas turbine engines 2 mounted beneath the wings 3 thereof. A wing mounted fuel tank 4 is shown from which fuel is drawn for use in the engine. Fuel from the tank 4 passes into a heat exchange system before passing through a fuel filter which is part of the engine fuel system.

Referring now to FIG. 2, which shows more detail of the fuel/oil heat exchange system, fuel from the aircraft fuel tank passes via a fuel line 10 to a heat exchanger 12 in which it picks up heat from coil 14 through which passes hot oil from the engine gearbox 16. On leaving the heat exchanger, fuel passes to the fuel filter 6 and on into the remainder of the engine fuel system 7.

The oil is pumped from the gearbox through the heat exchanger via a scavenge system which includes a pump 20 and pipework 22 which takes the oil from the gearbox through the heat exchanger coil 14 and back to an oil tank (not shown). The oil system is designed so that during normal operation of the engine the oil level in the tank 16 is low enough to avoid covering any of the teeth of the gears 23 within the gearbox, and the scavenge flow is such as to cause adequate cooling of the oil without overheating the fuel. In circumstances where more heat is required in the fuel, however, a valve, in this example illustrated as a door 24 in combination with a baffle 25 at the exit of the gearbox, is arranged to be movable to restrict the flow of oil from the gearbox so that the oil level in the gearbox will rise, the gears will begin to dip into the oil and heat the oil by the churning action of the gear teeth. In normal operation the oil flows out of the gearbox under the baffle 25, but when the door is dropped down to prevent this flow, the oil level rises as oil continues to flow into the gearbox until it spills over the baffle. At this level the gear teeth on at least some of the gears dip into the oil and churn it around. The alternative door position is shown in dotted lines.

The operation of the valve is controlled by means of a temperature sensor 26 which is placed in the fuel line close to the fuel filter, i.e. downstream of the heat exchanger 12, and the arrangement is such that should the temperature of the fuel entering the filter be reduced to the extent that there is a danger of the fuel waxing, the device 26 will close the valve 24 to the extent that the oil level in the gearbox will rise and the oil will be heated. When the temperature of the fuel leaving the heat exchanger has increased sufficiently, the device 26 will open the valve 24 to prevent excessive churning of the oil.

It can be seen that in this way blocking of the filter by waxing or icing of the fuel can be prevented by a self-regulating control which varies the heat input of the oil to the fuel and does not lead to excessive fuel heating.

Although the invention has been described with reference to preventing icing of the fuel filter, clearly the control device 26 can be positioned adjacent any part of the aircraft or engine fuel system, the minimum temperature of which is to be controlled.

Thus the invention provides a very simple modification to an engine to give temperature control of parts of the fuel system without the addition of air bleeds from the engine to an additional heat exchanger which would impose a performance penalty on the aircraft.

I claim:

1. A fuel/oil heat exchange system for an engine having a fuel system, an oil system and a gearbox, the heat exchange system comprising:
   a heat exchanger located to receive fuel flowing through the engine fuel system,
   a scavenge system for removing oil from the gearbox and passing it through the heat exchanger in heat exchange relationship with the fuel therein,
   a temperature sensitive device for sensing the temperature of the fuel at a location downstream of the heat exchanger, and,
   means controlled by the temperature sensitive device for varying the level of the oil in the gearbox in order to vary the heat input to the oil due to churning of the oil by the gears thereby controlling the temperature of the fuel at the location of the temperature sensing device.

2. A fuel/oil heat exchange system as claimed in claim 1 and in which the temperature sensing device is located adjacent a fuel filter at the inlet end of the fuel system.

3. A fuel/oil heat exchange system as claimed in claim 1 and in which the means for varying the level of the oil in the gearbox comprises a baffle disposed inside the gearbox adjacent the inlet to the scavenge system and defining an opening at a first relatively low level through which oil can leave the gearbox, and a movable door arranged to move under the control of the temperature sensing device to block the opening defined by the baffle thus causing the oil level in the tank to rise to the extent that the oil flows over the baffle before passing to the inlet of the scavenge system.

4. A fuel/oil heat exchange system as claimed in claim 2 and in which the means for varying the level of the oil in the gear box comprises a baffle disposed inside the gearbox adjacent the inlet to the scavenge system and defining an opening at a first relatively low level through which oil can leave the gearbox, and a movable door arranged to move under the control of the temperature sensing device to block the opening defined by the baffle thus causing the oil level in the tank to rise to the extent that the oil flows over the baffle before passing to the inlet of the scavenge system.

* * * * *